United States Patent
Ding et al.

(10) Patent No.: US 12,395,653 B2
(45) Date of Patent: Aug. 19, 2025

(54) METHOD AND APPARATUS FOR OPTIMIZING END-TO-END NEURAL IMAGE COMPRESSION FRAMEWORK

(71) Applicant: TENCENT AMERICA LLC, Palo Alto, CA (US)

(72) Inventors: Ding Ding, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 214 days.

(21) Appl. No.: 18/120,612

(22) Filed: Mar. 13, 2023

(65) Prior Publication Data
US 2023/0319298 A1    Oct. 5, 2023

Related U.S. Application Data

(60) Provisional application No. 63/325,117, filed on Mar. 29, 2022.

(51) Int. Cl.
*H04N 19/42* (2014.01)
*G06V 10/778* (2022.01)
*G06V 10/82* (2022.01)
*H04N 19/147* (2014.01)

(52) U.S. Cl.
CPC ........... *H04N 19/42* (2014.11); *G06V 10/778* (2022.01); *G06V 10/82* (2022.01); *H04N 19/147* (2014.11)

(58) Field of Classification Search
CPC .......... G06N 3/045; G06N 3/084; G06N 3/08; G06N 3/0455; G06N 3/044; G06N 3/047; G06N 3/082; G06N 3/04; G06N 3/0985; G06N 3/0464

USPC .......................................................... 375/240
See application file for complete search history.

(56) References Cited

U.S. PATENT DOCUMENTS

| | | | |
|---|---|---|---|
| 2020/0366914 A1* | 11/2020 | Schroers | G06N 3/02 |
| 2021/0142524 A1* | 5/2021 | Djelouah | H04N 19/90 |
| 2021/0360259 A1* | 11/2021 | Wang | G06N 3/08 |

OTHER PUBLICATIONS

Tencent Technology, ISRWO, PCT/US2023/015190, Jun. 15, 2023, 13 pgs.

* cited by examiner

*Primary Examiner* — Masum Billah
(74) *Attorney, Agent, or Firm* — Morgan, Lewis & Bockius LLP

(57) ABSTRACT

Neural network based image compression using an optimized end-to-end (E2E) neural image compression (NIC) framework being performed by at least one processor and includes receiving an input image to an E2E NIC framework, processing the input image in its entirety using an encoder in the E2E NIC framework to obtain a first bitstream representation of the input image in its entirety, reconstructing an output image from the first bitstream representation of the input image in its entirety using a decoder in the E2E NIC framework, optimizing the encoder in the E2E NIC framework by reducing a distortion loss between the input image and the output image, and processing the input image using the optimized encoder in the E2E NIC framework to obtain a second bitstream representation of the input image. Further, the input may be partitioned into blocks for which encoder optimization is performed for each block and each block is encoded instead of the entire image.

18 Claims, 6 Drawing Sheets

METHOD AND APPARATUS FOR OPTIMIZING END-TO-END NEURAL IMAGE COMPRESSION FRAMEWORK

CROSS-REFERENCE TO RELATED APPLICATIONS

This application claims priority to U.S. Provisional Patent Application No. 63/325,117, entitled "TRAINABLE MODULE TO NEURAL IMAGE COMPRESSION," filed on Mar. 29, 2022, which is incorporated by reference in its entirety.

TECHNICAL FIELD

The disclosed implementations relate generally to artificial neural network-based video/image compression, and in particular, to method and system for optimizing end-to-end (E2E) neural image compression (NIC) network.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese AVS standard has also formed AVS-AI special group to work on neural image and video compression technologies. The success of recent approaches has brought more and more industrial interests in advanced neural image and video compression methodologies.

SUMMARY

According to exemplary embodiments, a method of compressing an image using an optimized end-to-end (E2E) neural image compression (NIC) framework is performed by a computing device, the method including: receiving an input image; processing the input image using an encoder in the E2E NIC framework to obtain a first bitstream representation of the input image; reconstructing an output image from the first bitstream representation using a decoder in the E2E NIC framework; optimizing the encoder in the E2E NIC framework by reducing a distortion loss between the input image and the output image; and processing the input image using the optimized encoder in the E2E NIC framework to obtain a second bitstream representation of the input image.

According to exemplary embodiments, an apparatus for compressing an image using an optimized end-to-end (E2E) neural image compression (NIC) framework is provided, the apparatus comprising at least one memory configured to store program code, and at least one processor configured to read the program code and operate as instructed by the program code to perform the aforementioned method.

According to exemplary embodiments, a non-transitory computer readable medium stores instructions that, when executed by at least one processor for compressing an image using an optimized end-to-end (E2E) neural image compression (NIC) framework, cause the at least one processor to perform the aforementioned method.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Embodiments may include receiving an image, performing an optimization process to tune certain elements of an end-to-end (E2E) neural image compression (NIC) framework, and encoding the image into a bitstream to optimize a rate-distortion performance of coding the image based on the E2E NIC framework. The E2E NIC framework can be an artificial neural network (ANN) based image or video coding framework that is pretrained with certain fixed modules and one or more trainable modules. In an artificial neural network-based video coding framework, by performing an online training process to the one or more trainable modules, the entire performance of different modules can be further optimized to improve a final objective (e.g., rate-distortion performance), resulting in an end-to-end (E2E) optimized NIC framework.

Figure 1:
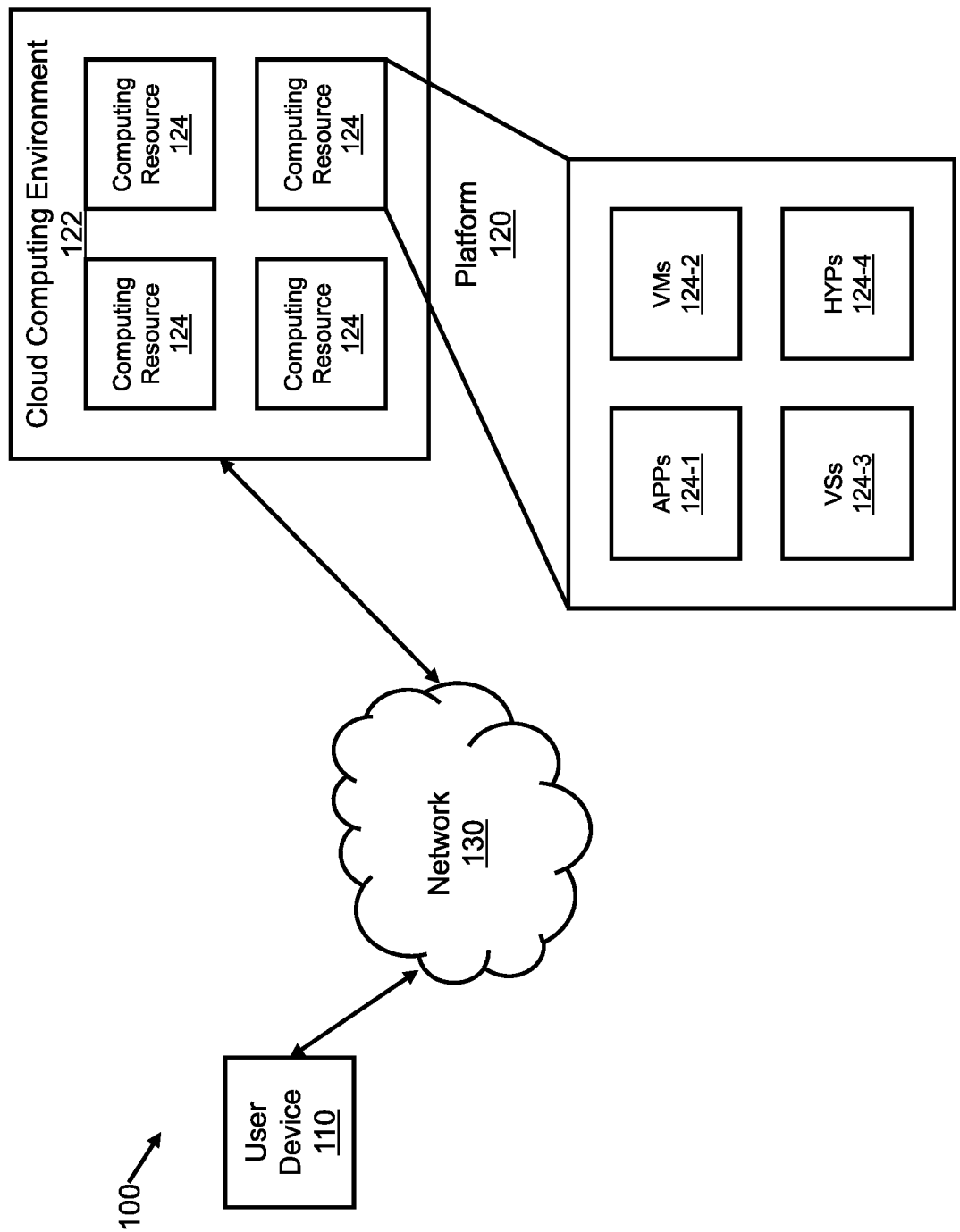
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
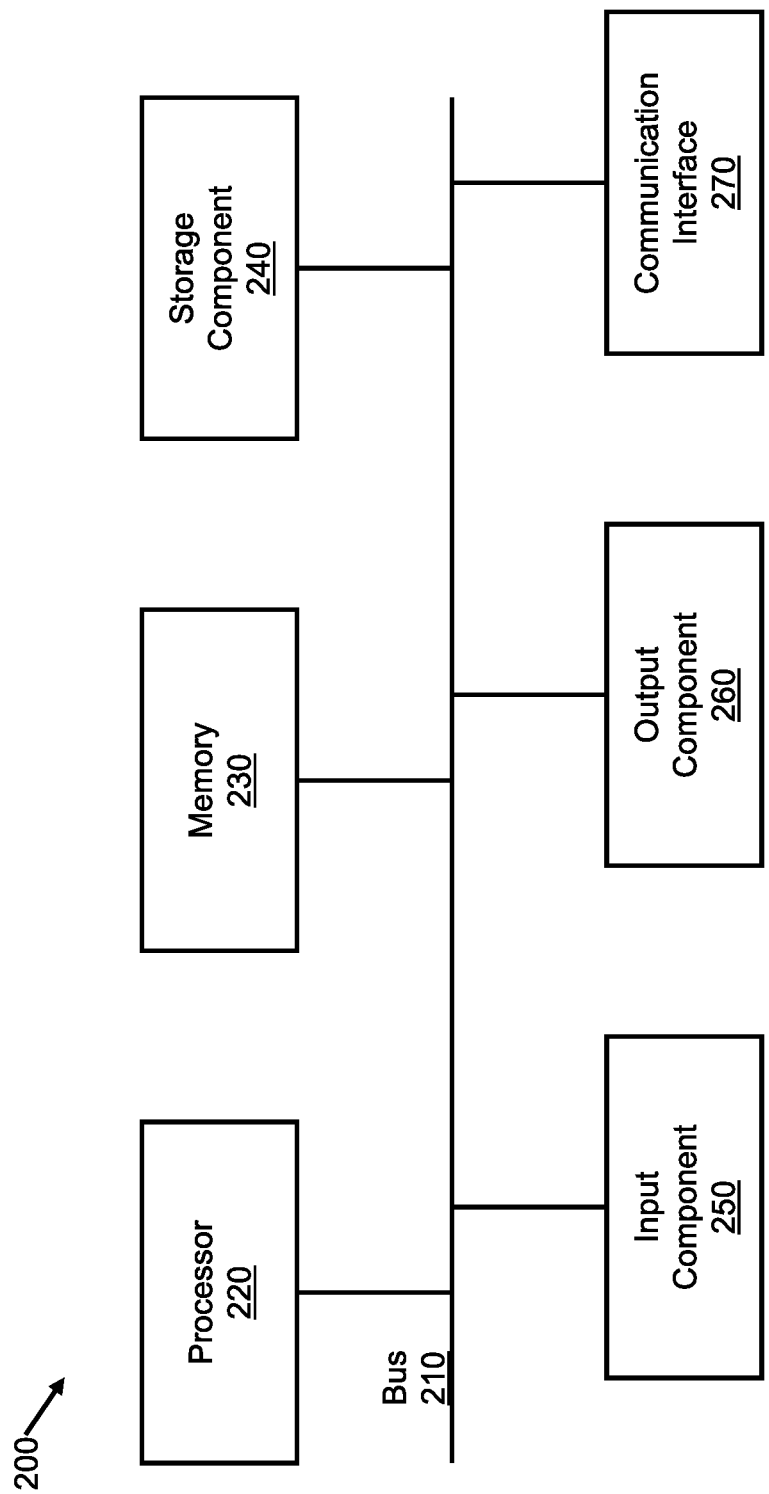
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200.

For example, the storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Neural Image Compression (NIC) is an artificial intelligence (AI)-based end-to-end neural image compression for image and video compression/decompression using artificial neural network technology, e.g., Deep Neural Networks (DNN). Given an input image x, the target of NIC is to use the image x as the input to a DNN encoder to compute a compressed representation $\hat{x}$ that is compact for storage and transmission purposes and then use the compressed representation $\hat{x}$ as the input to a DNN decoder to reconstruct an image x. Some NIC methods may take a variational auto-encoder (VAE) structure, where the DNN encoders directly use the entire image x as its input, which is passed through a set of network layers that work like a black box to compute the output representation (i.e., the compressed representation $\hat{x}$). Correspondingly, the DNN decoder takes the entire compressed representation $\hat{x}$ as its input, which is passed through another set of network layers that work like another black box to compute the reconstructed image $\bar{x}$. A Rate-Distortion (R-D) loss is optimized to achieve trade-off between the distortion loss D (x, $\bar{x}$) of the reconstructed image $\bar{x}$ and the bit consumption R of the compressed representation $\hat{x}$ with a trade-off hyperparameter λ using the following target loss function L (x, $\bar{x}$, $\hat{x}$):

$$L(x,\bar{x},\hat{x})=\lambda D(x,\bar{x})+R(\hat{x}) \qquad \text{Equation (1)}$$

Embodiments of the present application propose that, for each input image to be compressed, a trainable image processing module may be used for tuning the encoder within the E2E NIC framework to find an optimized E2E NIC framework and compress the input image into a bit-stream with a better rate-distortion performance. Online training is used to find an optimal parameter for the trainable module, so that the input image is compressed by using this optimized module and the encoder in the E2E NIC framework. By using this trainable image processing module, the rest of the optimized E2E NIC framework can be an artificial neural network (ANN) based image or video coding framework that is pretrained with pre-configured or fixed parameters. This trainable image processing module and associated method executed by the trainable image processing module can be used as a preprocessing step for boosting the compression performance of any E2E NIC framework method. It does not require any training or fine-tuning on the pretrained compression model itself in the E2E NIC framework or any training data. A detailed method and an apparatus for the preprocessing model, according to one or more embodiments, will now be described.

Learning-based image compression can be viewed as a two-step mapping process. The original image $x_0$ in a high dimensional space is mapped to a bit-stream with length R ($x_0$) by an encoder, which is then mapped back to the original space at $\bar{x}_0$ by a decoder with a distortion loss D ($\bar{x}_0$, $x_0$).

Figure 3:
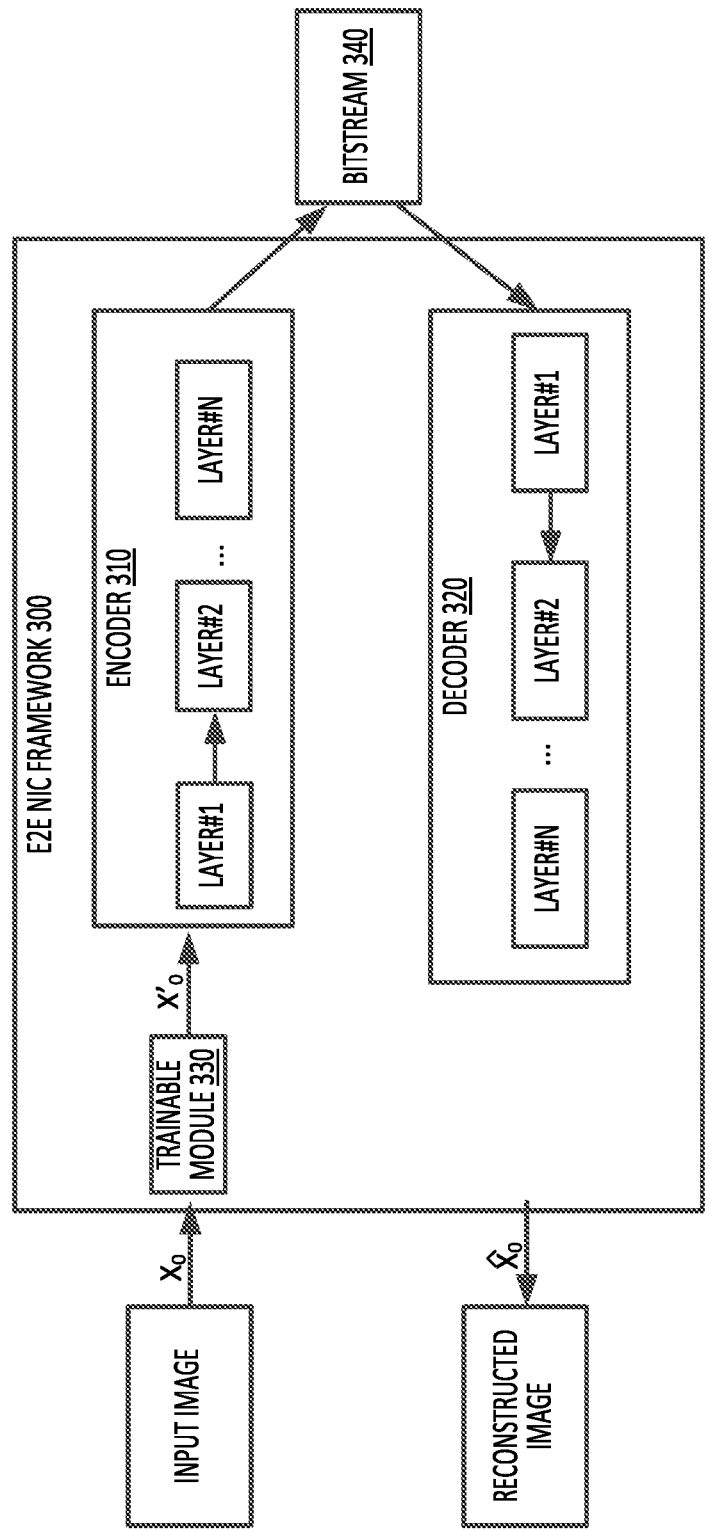
FIG. 3 is an example diagram illustrating an optimized end-to-end (E2E) neural image compression (NIC) framework, according to embodiments.

FIG. 3 is an example diagram illustrating an optimized end-to-end (E2E) neural image compression (NIC) framework 300, according to embodiments. The E2E NIC framework 300 includes an encoder 310 and a decoder 320. In some embodiments, the encoder 310 and the decoder 320 networks have corresponding structure. For example, as depicted in FIG. 3, the encoder 310 is a multi-layer artificial neural network including, e.g., layer #1, layer #2, . . . , layer #N, such that the output of one layer of artificial neural network is the input of a subsequent layer of artificial neural network. Similarly, the decoder 320 is a multi-layer artificial neural network including, e.g., layer #1, layer #2, . . . , layer #N, such that the output of one layer of artificial neural network is the input of a subsequent layer of artificial neural network.

In some embodiments, the input image $x_0$ is first processed by the encoder 310 and compressed into the bitstream 340. The bitstream 340 is then processed by the decoder 320 into a reconstructed image $\bar{x}_0$. A loss function including at least the distortion loss D ($\bar{x}_0$, $x_0$) associated with processing a number of training images using this E2E NIC framework is used for adjusting the parameters in the encoder 310 and the decoder 320 to achieve an optimized E2E NIC framework for other images that have similarities with the training images. However, when the optimized E2E NIC framework is used for processing an image that is less similar to the training images, the result is often less optimal. On the other hand, this training process of the framework not only consumes a great amount of computational power but is also time expensive. It is sometimes impractical to recalibrate the optimized E2E NIC framework for processing only a small number of images that are less similar to the training images.

In some embodiments, as shown in FIG. 3, a trainable module 330 is introduced into the optimized E2E NIC framework, e.g., being added to the frontend of the encoder 310 as a preprocessing module that maps $x_0$ to $x'_0$. The output of the trainable module 330, $x'_0$, is then processed by the same optimized E2E NIC framework to produce another reconstructed image $\widehat{x'_0}$ that is closer to $x_0$ based on a distance measurement or loss function (smaller loss function). As such, the optimized E2E NIC framework can achieve a better compression performance with the help of the trainable module. Best compression performance is achieved at the global minimum of Equation (1) above.

There is no limit on the network structure of the trainable module 330. In some embodiments, the trainable module 330 is a convolution neural network (CNN). In other embodiments, the trainable module 330 is a set of ResBlocks. A ResBlock is constructed out of normal network layers connected with rectified linear units (ReLUs) and a pass-through below that feeds through the information from previous layers unchanged. The network part of the ResBlock can consist of two or more layers of neural network.

In some embodiments, online training is used for tuning the parameters of the trainable module 330 to achieve a better perform for the E2E NIC framework 300. The trainable module 330, in one embodiment, is pretrained networks, and will be optimized during the optimization of the entire framework. In another embodiment, the parameters of the trainable module are newly initialized and will be tuned during optimization. For example, the trainable module 330 has an initial set of parameters. A set of training images collected, e.g., on the Internet are fed into the E2E NIC framework 300 including the trainable module 330 to tune the parameters of the trainable module 330 while the rest of the E2E NIC framework 300, e.g., the encoder 310 and the decoder 320 are unchanged.

After the tuning process, the E2E NIC framework 300 including the optimized trainable module 330 can process images similar to the set of training images used for online training. It should be noted that the trainable module 330 can be located at any location on the encoder side. For example, it can be located at the frontend of the encoder 310 as shown in FIG. 3. In some other cases, the trainable module 330 can be added into the encoder 310. In this way, the decoder related operations require no changes. Changes are only applied at the trainable module that is in the encoder side.

Unlike in a model training phase where the gradient is used for updating the E2E NIC framework's parameters, the parameters of the encoder 310 and the decoder 320 are fixed and the gradient may be used to update the trainable module 330 itself. Since the entire framework is made differentiable (so that the gradients can be backpropagated) by replacing the non-differentiable parts with differentiable ones (e.g., replacing quantization with noise injection). Therefore, the above optimization can be iteratively solved by gradient descent.

There are two key hyperparameters in this preprocessing model: step size and number of steps. Step size indicates the 'learning rate' of the online training. Images with different types of content may correspond to different step sizes to achieve the best optimization results. Number of steps indicates the number of updates operated. Together with the target loss function L $(x, \bar{x}, \hat{x})$, the hyperparameters are used for the learning process. For example, the step size may be used in a gradient descent algorithm or a backpropagation calculation performed in the learning process. The number of iterations may be used as a threshold of a maximum number of iterations to control when the learning process can be terminated.

Figure 4:
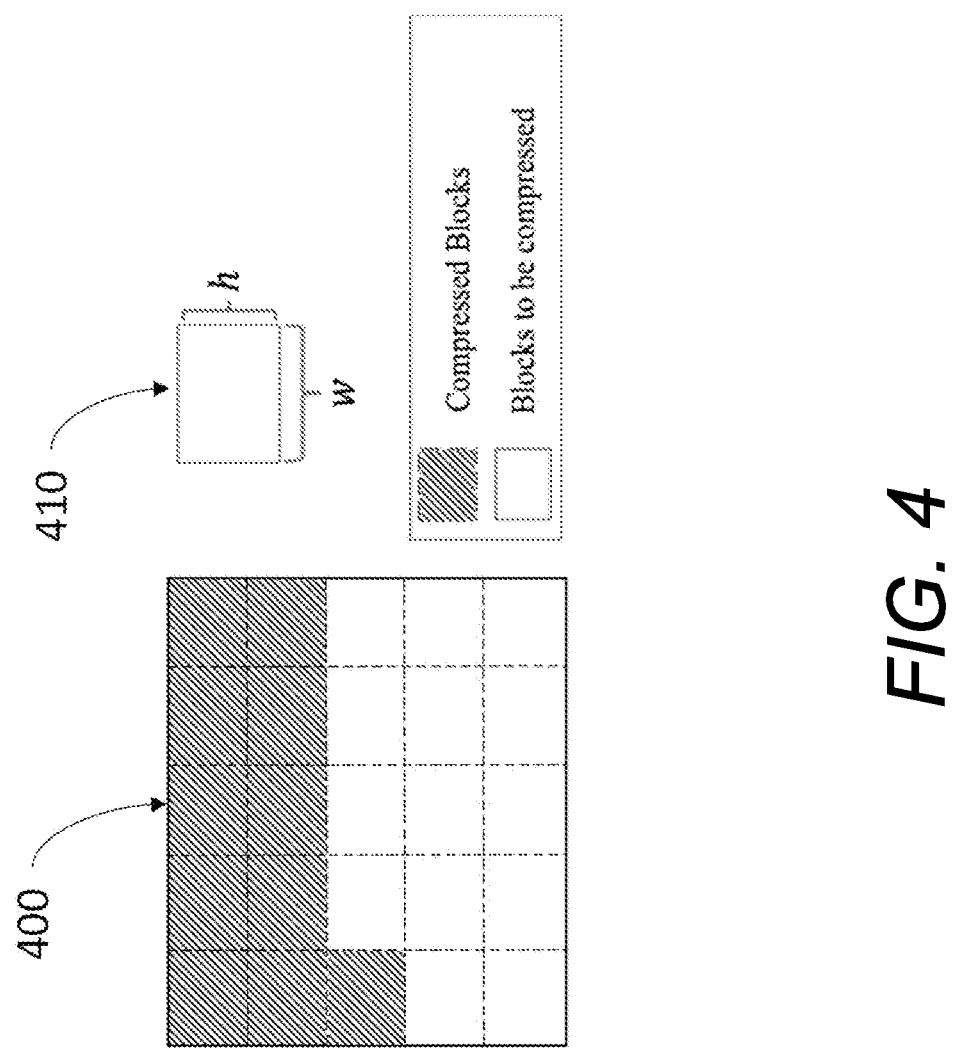
FIG. 4 illustrates an example of block-wise image coding.

FIG. 4 illustrates an example of block-wise image coding.

In an example embodiment, an image 400 may first split into blocks (illustrated by the dashed line in FIG. 4) and the spilt blocks may be compressed instead of the image 400 itself. The compressed blocks are shaded in FIG. 4 and the blocks to be compressed are not shaded. The split blocks may be equally sized or non-equally sized. The step size for each block may be different. To this end, different step sizes may be assigned for an image 400 in order to achieve better compression result. Block 410 is an example of one of the split blocks with a height h and width w.

In an example embodiment, an image may be compressed without splitting into blocks and the entire image is the input of the E2E NIC model. Different images may have different step sizes to achieve optimized compression results.

In another example embodiment, the step size may be chosen based on the characteristics of the image (or a block), for example, an RGB variance of the image. In embodiments, RGB may refer to a red-green-blue color model. Further, in another example embodiment, the step size may be chosen based on an RD performance of the image (or the block). Therefore, according to embodiments thereof, the trainable module 330 is optimized based on multiple step sizes, and the one with the better compression performance is chosen for optimizing the trainable module 330.

Figure 5:
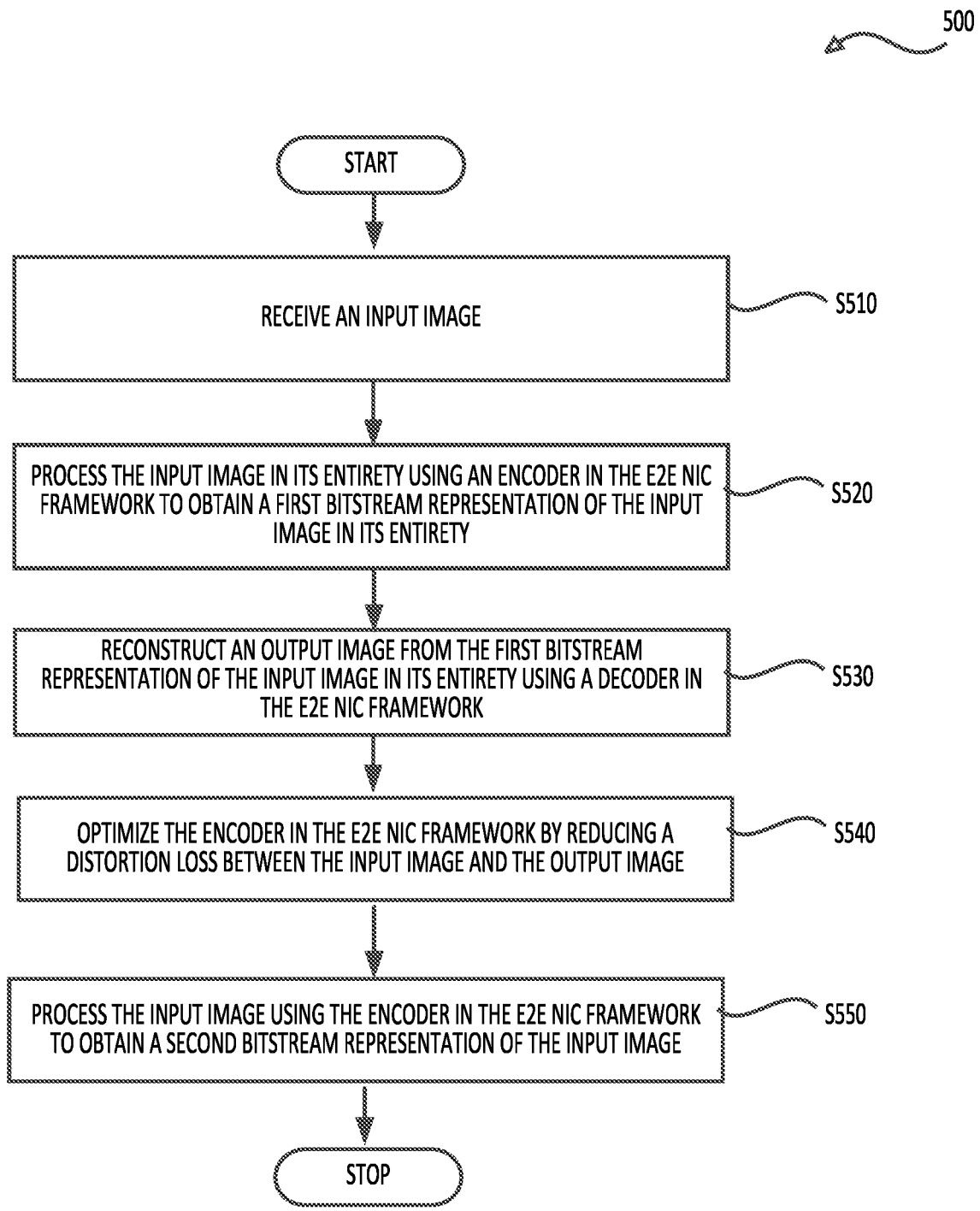
FIG. 5 is a flowchart of a method of performing optimized end-to-end (E2E) neural image compression (NIC), according to embodiments.

FIG. 5 is a flowchart of a method 500 of performing optimized end-to-end (E2E) neural image compression (NIC), according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation S510, the method 500 includes receiving an input image to an E2E NIC framework.

In operation S520, the method 500 includes processing the input image in its entirety using an encoder in the E2E NIC framework to obtain a first bitstream representation of the input image in its entirety. In some embodiments, there is a trainable module on the encoder side of the E2E NIC framework. The parameters of this trainable module can be adjusted to achieve a better performance for the E2E NIC framework as described above.

In operation S530, the method 500 includes reconstructing an output image from the first bitstream representation of the input image in its entirety using a decoder in the E2E NIC framework. In some embodiments, a loss function is generated based on the output image and the input image.

In operation S540, the method 500 includes optimizing the encoder in the E2E NIC framework by reducing a distortion loss between the input image and the output image. In some embodiments, the encoder in the E2E NIC framework is optimized using an online training process to find an optimal parameter(s) in the trainable module. For example, a set of training images may be collected from the Internet for training the parameters in the trainable module while the parameters in the rest of the E2E NIC framework remain unchanged.

In some embodiments, the online training process includes adjusting the trainable module according to a learning rate of the input image when at least a predefined number of iterations is performed by the online training process and/or the distortion loss between the input image and the output image is less than a predefined threshold. In other words, the encoder includes at least one fixed module whose parameters are not affected by the online training process.

In operation S550, the method 500 includes processing the input image using the optimized encoder in the E2E NIC framework to obtain a second bitstream representation of the input image. In some embodiments, one or more of the second bitstream or the compressed representation of the input image may be transmitted to, for example, a decoder and/or a receiving apparatus.

The method 500 may also include splitting the input image into one or more blocks. In this case, operations 520-550 are performed on each of the blocks instead of the entire input image. That is, the method 500 would further include determining an optimal trainable module for each of the split blocks, based on the training model of the E2E NIC framework, encoding the block to generate a block bitstream. The split blocks may have the same size or different sizes, and each block has a different learning rate.

The method 500 may use an artificial neural network based on a pretrained image coding model wherein the parameters of the artificial neural network are fixed and a gradient is used to update the input image.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
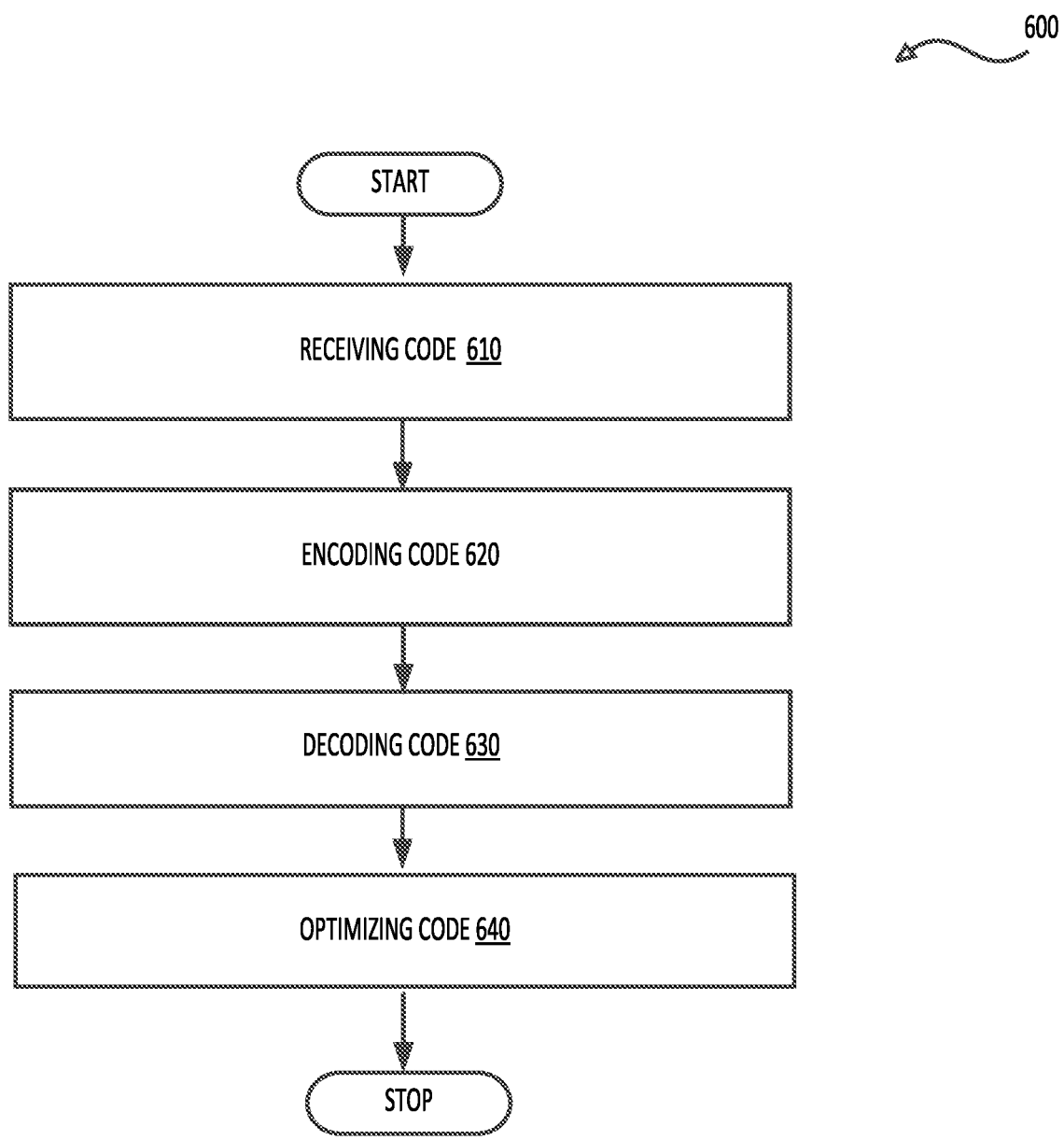
FIG. 6 is a block diagram of an apparatus for optimizing end-to-end (E2E) neural image compression (NIC), according to embodiments.

FIG. 6 is a block diagram of an apparatus for optimizing end-to-end (E2E) neural image compression (NIC), according to embodiments.

As shown in FIG. 6, the apparatus 600 includes receiving code 610, encoding code 620, decoding code 630, and optimizing code 640.

The receiving code 610 is configured to cause at least one processor to receive an input image to an E2E NIC framework.

The encoding code 620 is configured to cause at least one processor to (i) process the input image in its entirety using an encoder in the E2E NIC framework to obtain a first bitstream representation of the input image in its entirety and (ii) process the input image in its entirety using the optimized encoder in the E2E NIC framework to obtain a second bitstream representation of the input image in its entirety.

The decoding code 630 is configured to cause at least one processor to reconstruct an output image from the first bitstream representation of the input image in its entirety using a decoder in the E2E NIC framework.

The optimizing code 640 is configured to cause at least one processor to optimize the encoder in the E2E NIC framework by reducing a distortion loss between the input image and the output image.

The apparatus 600 may further include splitting code configured to cause at least one processor to split the input image into one or more blocks. In this case, the encoding code 620, the decoding code 630, and the optimizing code 640 are performed using each of the split blocks instead of the entire input image.

Additionally, the apparatus 600 may use an artificial neural network based on a pretrained image coding model wherein the parameters of the artificial neural network are fixed and a gradient is used to update the input image.

Although FIG. 6 shows example blocks of the apparatus, in some implementations, the apparatus may include additional blocks, fewer blocks, different blocks, or differently arranged blocks than those depicted in FIG. 6. Additionally, or alternatively, two or more of the blocks of the apparatus may be combined.

Embodiments herein describe E2E image compression methods. The methods exploit the introduction of a trainable image processing module to improve the E2E NIC coding efficiency by using a flexible and general framework that accommodates various types of quality metrics.

The E2E image compression methods, according to one or more embodiments, may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of compressing an image using an end-to-end (E2E) neural image compression (NIC) framework performed by a computing device, the method compressing:
receiving an input image;
processing the input image in its entirety using an encoder in the E2E NIC framework to obtain a first bitstream representation of the input image in its entirety;
reconstructing an output image from the first bitstream representation of the input image in its entirety using a decoder in the E2E NIC framework;
optimizing the encoder in the E2E NIC framework by reducing a distortion loss between the input image and the output image, wherein the encoder includes a trainable module and a fixed module and the optimizing the encoder in the E2E NIC framework includes using an online training process to update at least one parameter in the trainable module while fixing parameters in the fixed module and the at least one parameter in the trainable module includes step size and number of steps for processing the input image and the parameters in the fixed module include a trade-off hyperparameter between the distortion loss and a bit consumption of the first bitstream representation; and
processing the input image using the optimized encoder in the E2E NIC framework to obtain a second bitstream representation of the input image.

2. The method according to claim 1, wherein the online training process includes adjusting the trainable module according to a learning rate of the input image when at least a predefined number of iterations is performed by the online training process and/or the distortion loss between the input image and the output image is less than a predefined threshold.

3. The method according to claim 2, wherein the learning rate is dependent on characteristics of the input image such that different input images have different learning rates.

4. The method according to claim 1, wherein the input image is first processed by the optimized trainable module and then processed by the fixed module.

5. The method according to claim 1, wherein the input image is first processed by the fixed module and then processed by the optimized trainable module.

6. The method according to claim 1, wherein the trainable module in the E2E NIC framework is an artificial neural network with a set of pretrained parameters used to update the input image.

7. An apparatus for compressing an image using an optimized end-to-end (E2E) neural image compression (NIC) framework, the apparatus comprising:
at least one memory configured to store program code; and
at least one processor configured to read the program code and operate as instructed by the program code, the program code comprising:
receiving an input image;
processing the input image in its entirety using an encoder in the E2E NIC framework to obtain a first bitstream representation of the input image in its entirety;
reconstructing an output image from the first bitstream representation of the input image in its entirety using a decoder in the E2E NIC framework;
optimizing the encoder in the E2E NIC framework by reducing a distortion loss between the input image and the output image, wherein the encoder includes a trainable module and a fixed module and the optimizing the encoder in the E2E NIC framework includes using an online training process to update at least one parameter in the trainable module while fixing parameters in the fixed module and the at least one parameter in the trainable module includes step size and number of steps for processing the input image and the parameters in the fixed module include a trade-off hyperparameter between the distortion loss and a bit consumption of the first bitstream representation; and
processing the input image using the optimized encoder in the E2E NIC framework to obtain a second bitstream representation of the input image.

8. The apparatus according to claim 7, wherein the online training process includes adjusting the trainable module according to a learning rate of the input image when at least a predefined number of iterations is performed by the online training process and/or the distortion loss between the input image and the output image is less than a predefined threshold.

9. The apparatus according to claim 8, wherein the learning rate is dependent on characteristics of the input image such that different input images have different learning rates.

10. The apparatus according to claim 7, wherein the input image is first processed by the optimized trainable module and then processed by the fixed module.

11. The apparatus according to claim 7, wherein the input image is first processed by the fixed module and then processed by the optimized trainable module.

12. The apparatus according to claim 7, wherein the trainable module in the E2E NIC framework is an artificial neural network with a set of pretrained parameters used to update the input image.

13. A non-transitory computer readable medium storing instructions that, when executed by at least one processor for compressing an image using an optimized end-to-end (E2E) neural image compression (NIC) framework, cause the at least one processor to perform operations including:
receiving an input image;
processing the input image in its entirety using an encoder in the E2E NIC framework to obtain a first bitstream representation of the input image in its entirety;
reconstructing an output image from the first bitstream representation of the input image in its entirety using a decoder in the E2E NIC framework;
optimizing the encoder in the E2E NIC framework by reducing a distortion loss between the input image and the output image, wherein the encoder includes a trainable module and a fixed module and the optimizing the encoder in the E2E NIC framework includes using an online training process to update at least one parameter in the trainable module while fixing parameters in the fixed module and the at least one parameter in the trainable module includes step size and number of steps for processing the input image and the parameters in the fixed module include a trade-off hyperparameter between the distortion loss and a bit consumption of the first bitstream representation; and processing the input image using the optimized encoder in the E2E NIC framework to obtain a second bitstream representation of the input image.

14. The non-transitory computer readable medium according to claim 13, wherein the online training process includes adjusting the trainable module according to a learning rate of the input image when at least a predefined number of iterations is performed by the online training process and/or the distortion loss between the input image and the output image is less than a predefined threshold.

15. The non-transitory computer readable medium according to claim 14, wherein the learning rate is dependent on characteristics of the input image such that different input images have different learning rates.

16. The non-transitory computer readable medium according to claim 13, wherein the input image is first processed by the optimized trainable module and then processed by the fixed module.

17. The non-transitory computer readable medium according to claim 13, wherein the input image is first processed by the fixed module and then processed by the optimized trainable module.

18. The non-transitory computer readable medium according to claim 13, wherein the trainable module in the E2E NIC framework is an artificial neural network with a set of pretrained parameters used to update the input image.

* * * * *